Nov. 21, 1950 W. E. KOCK 2,530,826

RADIO RELAY SYSTEM

Filed Feb. 3, 1948 4 Sheets-Sheet 1

INVENTOR
W. E. KOCK
BY A. J. Zerbarini
ATTORNEY

INVENTOR
W. E. KOCK
BY
A. J. Zerbarini
ATTORNEY

RADIO RELAY SYSTEM

Filed Feb. 3, 1948 4 Sheets-Sheet 3

INVENTOR
W. E. KOCK
BY A. J. Zerbarini
ATTORNEY

Nov. 21, 1950 W. E. KOCK 2,530,826

RADIO RELAY SYSTEM

Filed Feb. 3, 1948 4 Sheets-Sheet 4

INVENTOR
W. E. KOCK
BY A. J. Zerbarini
ATTORNEY

Patented Nov. 21, 1950

2,530,826

UNITED STATES PATENT OFFICE 2,530,826

RADIO RELAY SYSTEM

Winston E. Kock, Middletown, N. J., assignor to Bell Telephone Laboratories, Incorporated, New York, N. Y., a corporation of New York Application February 3, 1948, Serial No. 5,952

17 Claims. (Cl. 250—15)

This invention relates to systems for relaying waves and to relay stations used in such systems.

As is known, radio relay stations heretofore proposed for so-called one-way or two-way communication in general comprise a plurality of passive members of the plane or parabolic reflective type. Thus, in the one-way systems disclosed in patents 1,939,345, F. Gerth et al., December 12, 1933; 2,140,730 to J. C. Batchelor, December 20, 1938, and 2,382,414, C. W. Hansell, August 14, 1945, each relay station comprises a pair of differently directed parabolic reflectors, one associated with a transmitting antenna and the other with a receiving antenna; and, in the one-way system disclosed in patent 2,042,302, S. G. Franz et al., May 26, 1936, the reflective system comprises a pair of plane reflectors facing a parabolic reflector. A two-way system using the invention of the Franz et al. patent would comprise separate reflective systems of the type described above for each one-way communication. In the two-way system described in Patent 2,250,532, C. W. Hansell, July 29, 1941, a pair of parabolic reflectors are utilized and in the two-way system illustrated by Fig. 3 of Patent 1,927,394, R. H. Darbord, September 19, 1933 two reflective systems, each comprising a pair of plane reflectors associated with a parabolic reflector, are employed. While the reflective type of relay system mentioned above may be employed with some degree of success, this type of system has certain disadvantages, and it now appears desirable to utilize systems which do not possess these disadvantages and which have, in addition, distinct attributes not found in the reflective type of system. In particular, it appears desirable to utilize a one-way or two-way relay antenna system which is simple, inexpensive and highly efficient, as compared to the systems heretofore employed.

It is one object of this invention to relay waves in a more efficient manner than heretofore accomplished.

It is another object of this invention to eliminate so-called cross-talk at a relay station.

It is another object of this invention to relay radio waves without utilizing passive antenna members of the reflective type.

It is another object of this invention to utilize at a relay station, for one-way or two-way communication, only one passive or secondary antenna member common to all active or primary antenna members.

It is another object of this invention to render the directive action of a relay station independent of small movements or displacements of the relay antenna system.

It is still another object of this invention to utilize at a relay station an antenna system which, as compared to systems of the prior art, is simple, inexpensive and easily maintained.

As used herein the term "wave" generically includes longitudinal waves, such as sonic or supersonic waves, and transverse or electromagnetic waves such as light and radio waves.

In accordance with one embodiment of the invention, a relay station comprises a transmitting horn, a receiving horn spaced therefrom, a one-way repeater connected between the aforesaid horns and a metallic lens common to, and positioned approximately between, said horns. The horns are positioned at a distance from, and on the same side of, the axis of the lens. The horns and the mid-point of the lens are at substantially the same height.

The invention will be more fully understood from a perusal of the following detail description taken in conjunction with the drawing on which like reference characters denote elements of similar function and on which:

Figure 1:
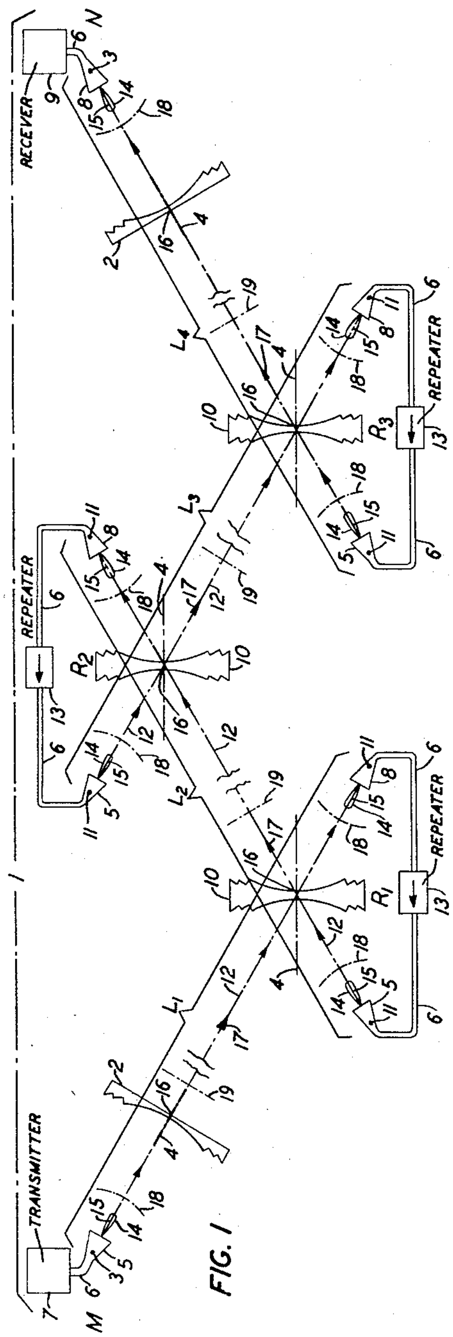
Fig. 1 is a plan view of a zig-zag relay system arranged in accordance with the invention and comprising several one-way relay stations, each constructed in accordance with the invention.

Referring to Fig. 1, the ground or horizontal plane arrangement of a one-way super-high frequency radio relay system 1 having four links $L_1$, $L_2$, $L_3$, and $L_4$ and comprising a transmitting terminal station M, a receiving terminal station N and three intermediate relay stations $R_1$, $R_2$ and $R_3$, is illustrated. Terminal station M comprises a plano-concave circularly-symmetrical metallic lens 2 having an on-axis focal point 3 and an electromagnetic axis 4, a transmitting point-type primary antenna 5 as, for example, a pyramidal horn, having its throat orifice positioned at the lens on-axis focal point 3 and a dielectric guide 6 connecting the horn 5 to a transmitter 7. Terminal station N comprises a similar lens 2, a receiving point-type horn 8 and a guide 6 connecting horn 8 to a receiver 9. The throat orifice of horn 8 is located at the on-axis focal point 3 of lens 2. Each relay station comprises a biconcave circularly-symmetrical metallic lens 10 having an axis 4, a pair of off-axis focal points 11 lying on the regularly related paths 12 of the waves incoming and outgoing through the relay lens 10, a receiving horn 8, a transmitting horn 5 and a unilateral repeater 13 connected between the horns 8 and 5. The throat orifices of the horns 8 and 5 are positioned at the off-axis focal points 11. In more detail, the off-axis focal points 11 of each biconcave lens are located on opposite sides of the lens and at a distance from, and on the same side of, the lens axis 4. As shown in Fig. 1, the horns at the terminal and relay stations each have a horizontal plane unidirective pattern comprising a major lobe 14 having a principal axis 15 aligned with the longitudinal axis of the horn. The axes 15 of the lobes of the two cooperating transmitting and receiving horns located at the two stations in each of the links $L_1$, $L_2$, $L_3$ and $L_4$, are coincident with the line or wave path 12 passing through the vertices or mid-points 16 of the lenses located at the two aforesaid stations. Hence, the relay arrangement has a "zig-zag" configuration, the adjacent paths 12 of wave propagation, or the adjacent links, being angularly related, rather than colinear. As shown by the arrowheads 17, the wave propagation or communication, is one way. While the lenses are shown uniformly spaced, in practice the spacings are not usually uniform. Moreover, any practical number of relay stations may be utilized. Also, while the vertices or mid-points 16 of the lenses in the set of alternate stations comprising stations M, $R_2$ and N are shown located on a straight geographical line and the mid-points 16 of the lenses in the alternate stations comprising stations $R_1$ and $R_3$ are shown located on another straight line, in practice the mid-points 16 of the lenses in either set may not be located on a line.

The lenses 2 and 10, Fig. 1, are of the "fast" or phase-advance dielectric guide type disclosed and claimed in my copending application Serial No. 642,723 filed January 22, 1946. If desired, however, a plano-convex metallic lens and a biconvex metallic lens, each of the "slow" or phase-delay artificial dielectric type illustrated in Fig. 3 and disclosed and claimed in my copending application Serial No. 748,448 filed May 16, 1947, may be employed respectively in place of the plano-concave metallic lens 2 and the biconcave metallic lens 10. The unilateral repeater 13 is of a type known in the art as, for example, either of the repeaters illustrated by Fig. 3 on page 440 of the Bell Laboratories Record, December 1947.

In operation, Fig. 1, considering link $L_1$, modulated super-high frequency waves having a carrier frequency $F_1$, say 4,000 megacycles, and a corresponding wavelength of 7.5 centimeters, are supplied by transmitter 7 to guide 6 and horn 5; and a wave originating at the focal point 3 of lens 2 and having a spherical front 18 is radiated towards the lens 2. The lens 2 converts the spherical wave front 18 to a plane wave front 19 and, at the adjacent relay station $R_1$, the incoming plane wave front 19 is converted by the biconcave lens 10 into a spherical front 18 converging on the off-axis focal point 11 and the throat orifice of the receiving horn 8. The received waves are then supplied over guide 6 to the repeater 13. In the repeater 13, at station $R_1$, the waves are amplified and the frequency $F_1$ is changed to a frequency $F_2$ where $F_1—F_2$ is in the order of about 40 megacycles. The waves are then supplied to the transmitting horn 5 and the associated lens 10 at station $R_1$. The lens 10 at station $R_1$ transforms the spherical wave front 18 originating at horn 5 to a plane wave front 19 directed towards the lens 10 at station $R_2$. At each of relay stations $R_2$ and $R_3$ the operation is the same as at station $R_1$, except that in the repeater 13 at station $R_2$ the frequency $F_2$ of the incoming waves is changed back to an outgoing frequency $F_1$ and, in the repeater at station $R_3$, the frequency $F_1$ of the incoming wave is changed again to the outgoing frequency $F_2$. The plane wave front 19 incoming to the plano-concave lens 2 at the receiving terminal station N is changed to a spherical front 18 converging on the focal point 13 aligned with horn 8 and the modulated waves are then supplied to the receiver 9.

The relay system of Fig. 1 possesses distinct advantages over the conventional system comprising at each relay station a pair of back-to-back parabolic reflectors. First of all, accidental movement of any of the lenses, as occasioned by adverse weather conditions, does not impair the directive action of the lens whereas, in the prior art parabolic system, even a slight movement of the reflector undesirably changes the directive action. Again, instead of the two passive antenna members required at each one-way relay station in the prior art reflector relay systems, only a single passive member, that is, only one lens, is required at each one-way relay station in the relay system illustrated by Fig. 1. Also, at each relay station, Fig. 1, the feedback from the transmitting horn to the receiving horn is small as compared to that in prior art systems comprising back-to-back reflectors.

Figure 2:
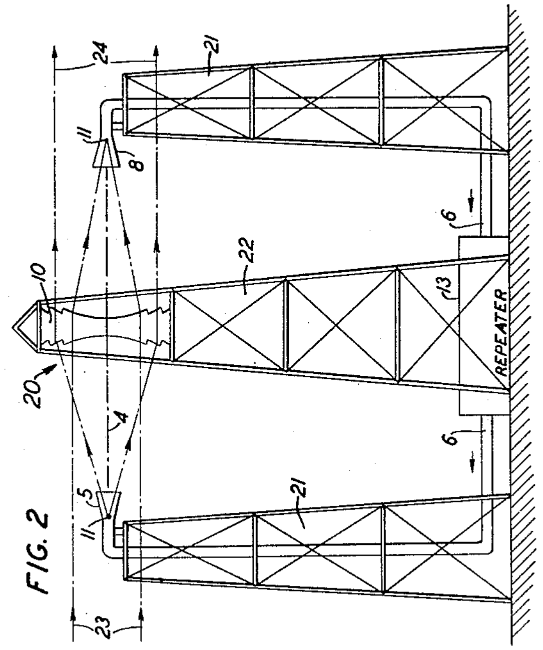
Fig. 2 is a side view of a one-way relay station suitable for use in the system of Fig. 1.

Referring to the view in elevation shown in Fig. 2, there is shown a relay station 20 comprising a main biconcave lens 10 having an axis 4 and the two off-axis foci 11. A receiving horn 8 is positioned at the right-hand focus 11 and a transmitting horn is positioned at the left-hand focus 11. A unilateral repeater 13 is connected by guides 6 between the receiver horn 8 and the transmitting horn 5. As shown on the drawing, the horns 8 and 5 are mounted on the left and right towers 21 and the lens 10 is mounted on the central tower 22, the tower heights being selected so that the horns 5 and 8 are positioned at the same height as the axis 4 of the lens 10. In operation, the wave 23 incoming along axis 4 is focussed by lens 10 on the right-hand focus 11 and on the receiving horn 8; and the received energy, after amplification in repeater 13, is radiated by horn 5. The outgoing spherical wave front diverging from the left-hand focus 11 is converted to a plane wave by lens 10 and the outgoing wave 24 is propagated along axis 4 in a direction opposite that of the incoming wave 23.

Figure 3:
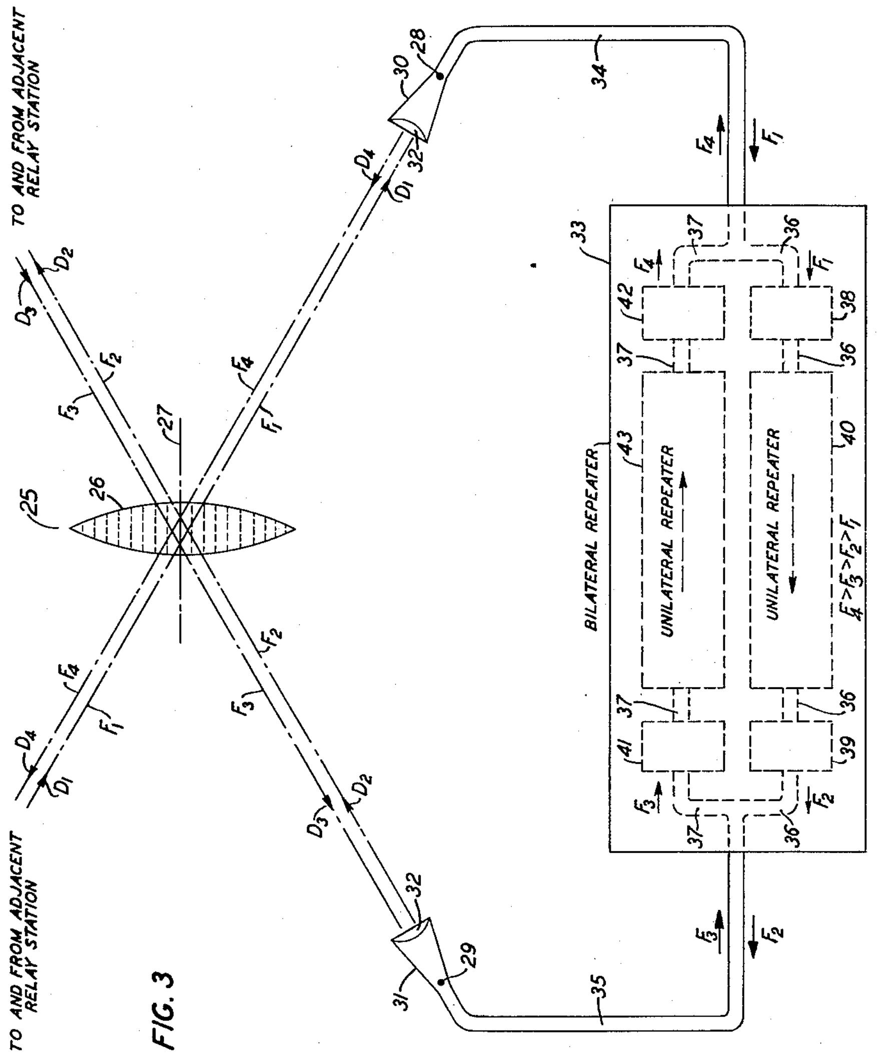
Fig. 3 is a plan view of a two-way relay station constructed in accordance with the invention and comprising a single main lens.

Referring to Fig. 3, there is shown a relay station 25 comprising a biconvex circularly-symmetrical metallic main lens 26 having an axis 27 and a pair of off-axis focal points 28, 29, a pair of transmit-receive pyramidal horns 30, 31, each positioned at one of the focal points 28, 29 and having in its mouth orifice a plano-concex circularly-symmetrical metallic lens 32, and a bilateral repeater 33 connected by the two main guides 34 and 35 between the throat orifices of the horns 30 and 31. The metallic lenses 26 and 32 are of the delay quasi-isotropic type disclosed and claimed in my copending application Serial No. 748,447 filed May 16, 1947. The bilateral repeater 33 comprises a pair of branch guides 36 and 37, each connected between the main guides 34 and 35. The branch guide 36 contains a pair of band filters 38 and 39 and a unilateral repeater 40 included between the filters 38 and 39; and the branch guide 37 contains a pair of band filters 41 and 42 and a unilateral repeater 43 included between the filters 41 and 42. As indicated on the drawing, filters 38, 39, 41 and 42 pass only a single frequency, namely, the frequencies $F_1$, $F_2$, $F_3$ and $F_4$ respectively. The frequencies $F_1$, $F_2$, $F_3$ and $F_4$ may, for example, be 4,000, 4,040, 4,080 and 4,120 megacycles, respectively.

In operation, Fig. 3, a wave incoming from a first adjacent relay station at the left side of relay station 25 and having a frequency $F_1$, a direction $D_1$ and a plane wave front, is focussed by the main lens 26 on the throat orifice of horn 30, that is, the incoming plane wave front is transformed to a spherical wave front converging on the off-axis focal point 28. The received wave $F_1$ is conveyed through main guide 34, branch guide 36, filter 38, unilateral repeater 40, filter 39, branch guide 36 and main guide 35 to the other horn 31. In the repeater 40, the frequency is changed from $F_1$ to $F_2$ and the wave is amplified. The spherical wave front diverging from horn 31 is converted by lens 32 to a plane wave front, and a wave of frequency $F_2$ is propagated along direction $D_2$ towards a second adjacent relay station on the other side of relay station 25. Similarly, a wave incoming from the relay station at the right side of relay station 25, and having a frequency $F_3$ and a propagation direction $D_3$, substantially opposite to direction $D_2$, is focussed by the lens 26 on the horn 31 and thence conveyed through main guide 35, branch guide 37, filter 41, repeater 43, filter 42, branch guide 37 and main guide 34 to horn 30. In repeater 43, the wave is amplified and the frequency is changed from $F_3$ to $F_4$. The wave outgoing from horn 30 has a spherical front, which is converted to a plane front by the lens 32; and a wave having a frequency $F_4$ and a propagation direction $D_4$ substantially coincident with direction $D_1$ is transmitted towards the adjacent relay station at the left. Hence, in accordance with the invention, a single passive device, namely, lens 26, is utilized at a two-way relay station. While interference at relay station 25 between the incoming and outgoing waves in each channel, and interference between the adjacent links, are effectively minimized by reason of the frequency diversity employed, if desired, polarization diversity may also be utilized for the purpose of effecting enhanced discrimination. Thus the oppositely directed waves $F_1$ and $F_4$ may be vertically and horizontally polarized, respectively; and the oppositely directed waves $F_3$ and $F_2$ may be vertically and horizontally polarized, respectively.

Figure 4:
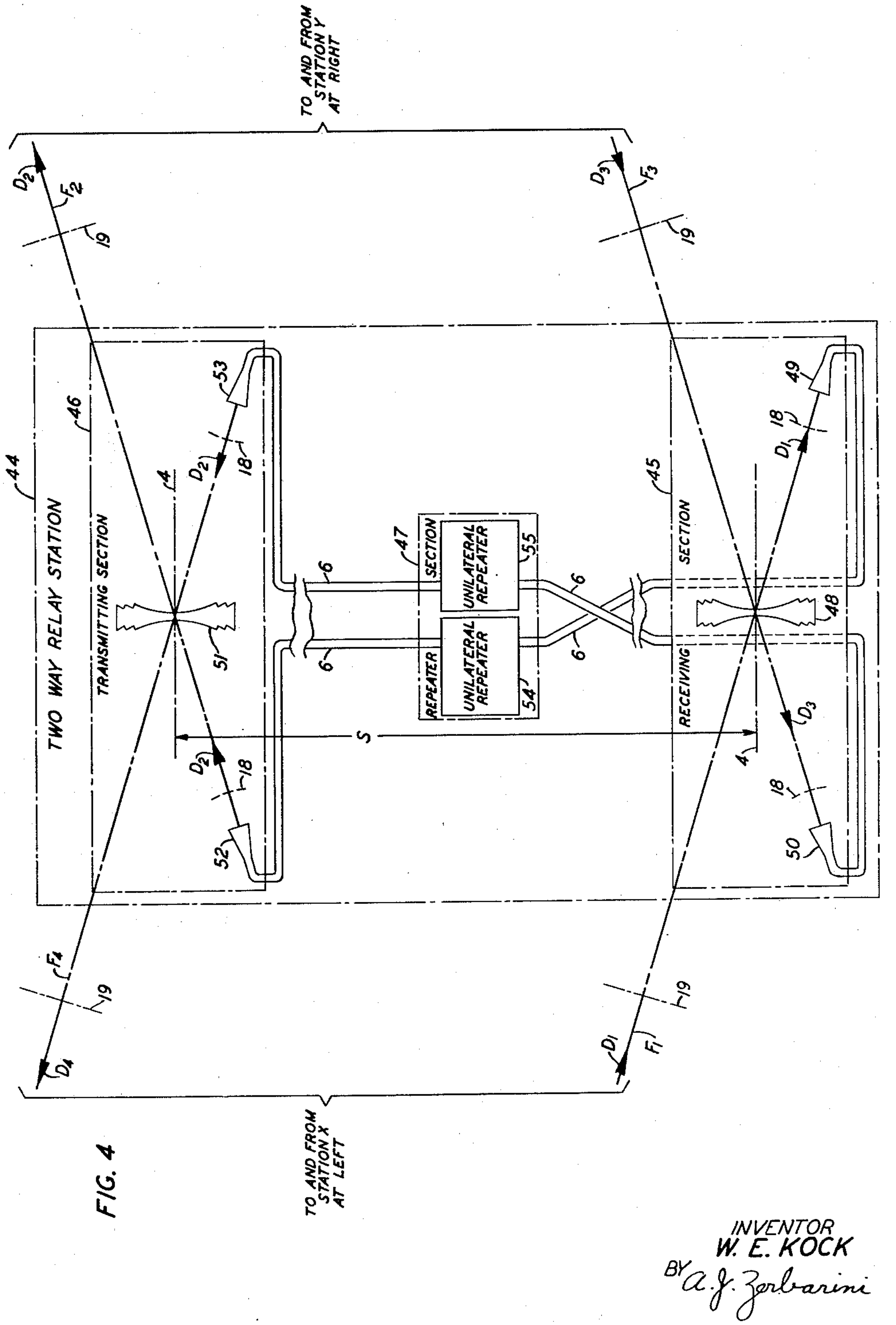
Fig. 4 is a plan view of a dual-lens two-way relay station constructed in accordance with the invention.

Referring to Fig. 4, a two-way radio relay station 44 comprises a low power-level bilaterally-receiving section 45, a high power-level bilaterally-transmitting section 46, and a repeater section 47 included between the first-mentioned two sections. The low level section 45 comprises a receiving biconcave circularly-symmetrical metallic lens 48 and a pair of point-type receiving horns 49 and 50; and the high level section 46 comprises a transmitting biconcave circularly-symmetrical metallic lens 51 and a pair of point-type transmitting horns 52 and 53. The electromagnetic axis 4 of the lens 51 is substantially parallel to the axis 4 of lens 48. The receiving section 45 and the transmitting section 46 are spaced a distance S in a direction perpendicular to the axes 4 of the lenses 48 and 51, as is explained more fully hereinafter. In each of sections 45 and 46, the two horns are located on opposite sides of the associated lens and on the same side of, and at a small distance from, the lens axis 4. The repeater section 47 comprises a unilateral repeater 54 connected by guides 6 between the receiving horn 49 and the transmitting horn 52 and a unilateral repeater 55 connected between the receiving horn 50 and the transmitting horn 53. The repeaters 54 and 55 are each similar to the repeater 13, Fig. 1, and each includes an amplifier and a frequency changer. Also, each of the metallic lenses 48 and 51 is of the phase-advance type, as in the system of Fig. 1, but if desired these lenses may be of the phase-delay type, as in the system of Fig. 3.

In operation, a radio wave of low power incoming from a terminal or relay station X at the left of station 44, and having a frequency $F_1$, a direction $D_1$ and a plane wave front 19, passes through the receiving lens 48 and the plane wave front 19 is converted by lens 48 to a spherical wave front 18 converging on the receiving horn 49. The received wave of low intensity is conveyed over one of the guides 6 to the repeater 54, amplified, changed to a frequency $F_2$ and supplied to the transmitting horn 52. The spherical wave front 18 diverging from horn 52 is converted by the transmitting lens 51 to a plane wave front 19 and a wave having a high power and a frequency $F_2$ is progagated along direction $D_2$ toward the relay or terminal station Y at the right of relay station 44. Similarly, a wave of low intensity incoming from station Y and having a frequency $F_3$, a direction $D_3$ and a plane wave front 19 passes through the receiving lens 48 and the plane wave front 19 is converted by lens 48 to a spherical wave front converging on the receiving horn 50. The received low intensity wave is conveyed over another guide 6 to the repeater 55, amplified, changed in frequency to a frequency $F_4$ and supplied to the transmitting horn 53. The spherical wave front 18 emanating from horn 53 is changed by the transmitting lens 51 to a plane wave front 19 and a wave having a frequency of $F_4$ and a high intensity is transmitted along direction $D_4$ towards station X. The directions $D_1$ and $D_2$ are substantially parallel to the directions $D_4$ and $D_3$, respectively. As in the system of Fig. 3, the frequencies $F_1$, $F_2$, $F_3$ and $F_4$ may be, for example, 4,000, 4,040, 4,080 and 4,120 megacycles.

In practice, it has been found that, at any relay station, the degree or amount of cross-talk between a pair of adjacent links or a pair of horns is directly, but not necessarily linearly, proportional to the relative power levels at the horns or in the links. In other words, the cross-talk is fairly well balanced and is a minimum if the power levels are substantially equal and the greater the difference in power level the greater the cross-talk, that is, the more the strong signal affects the weak signal. In general, at a relay station, the transmitted power is considerably greater than the received power and hence the cross-talk between a transmitting horn and a receiving horn is ordinarily more severe than that between two transmitting horns or two receiving horns. In accordance with the invention, as illustrated by the dual-lens two-way relay station of Fig. 4, separate transmitting and receiving lenses are utilized and the four transmitting and receivng horns are judiciously arranged, whereby minimum cross-talk obtains. Thus, the two horns associated with the same lens, and hence partly facing each other and positioned at a relatively small distance from each other, emit or collect energies of the same or comparable power levels, the levels being low in the receiving section 45 and high in the transmitting section 46. Also, since the two lenses are spaced far apart, that is, 100 to 200 feet, each receiving horn is positioned at a relatively large distance from the two transmitting horns. Accordingly little, if any, cross-talk occurs.

It may be pointed out that, as regards cross-talk diminution or elimination, the dual lens station of Fig. 4 is exceedingly more satisfactory than the prior art relay stations of the reflector type and certain relay stations of the refractor type disclosed herein and in my copending application Serial No. 642,723 mentioned above. More specifically, ordinarily less cross-talk occurs in the system of Fig. 4 than in (1) the single lens two-way relay station of Fig. 3, (2) a double-lens two-way relay station comprising two relay stations each in accordance with Fig. 3 and in which the two lenses are fairly close together and each lens is utilized for transmitting and receiving and (3) a four-lens two-way relay station comprising two one-way stations each in accordance with Fig. 24 of my above-mentioned copending application Serial No. 642,723 and in which the four horn lenses, two for transmitting in opposite directions and two for receiving in opposite directions, are positioned on the same tower and relatively close together.

Figure 5:
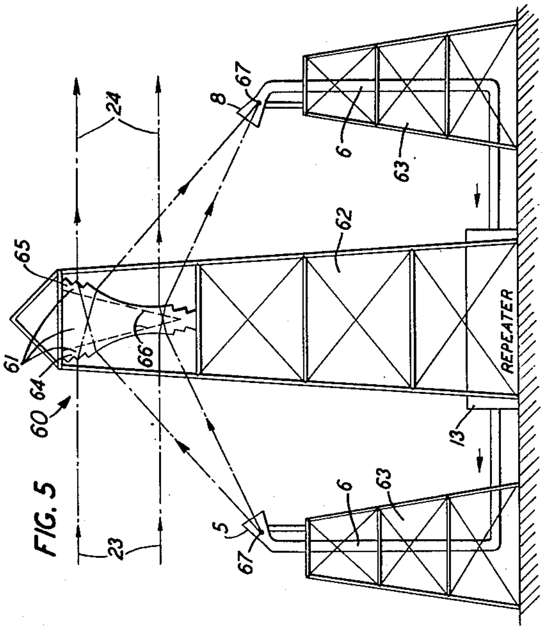
Fig. 5 is a side view of an "up-down" one-way relay station constructed in accordance with the invention.

Referring to Fig. 5, there is shown an "up-down" relay station 60 comprising a biconcave metallic dielectric guide type refractor 61 mounted on a high tower 62, a receiving horn 8 mounted on a low tower 63, a transmitting horn 5 also mounted on a low tower 63 and a repeater 13 connected by guides 6 between horns 8 and 5. The refractor 61 comprises two lens sections or portions 64 and 65 and a prism section 66 included therebetween, and it has two real foci 67 at which the horns 5 and 8 are located. It should be noted that the real foci 67 are positioned at a lower height than the refractor and at a distance below the horizontal paths traversed by the waves 23 and 24 incoming from the preceding relay station and outgoing to the succeeding relay station, respectively. The dielectric channels in the two focussing portions 64 and 65 and the non-focussing portion 66 of refractor 61 are contiguous and aligned so that these portions are not necessarily physically distinguishable.

The operation of the system of Fig. 5 is believed to be apparent from the discussion given above in connection with Fig. 2. Briefly, the wave 23 having a horizontal direction is focussed by the refractor 61 on horn 8, the incoming wave direction being, in a sense, bent downwards by the prism 66. The waves are amplified in repeater 13 and radiated by the horn 5 in an upward direction. The outgoing wave direction is changed to a horizontal direction by the prism 66 and the spherical wave front emanating from the horn 5 is converted to a plane wave front by the two lens sections 64 and 65. In the up-down system of Fig. 5 the horns 8 and 5 and associated towers, are spaced from the horizontal line-of-sight wave propagation path, whereby interference between the incoming and outgoing signals is substantially eliminated. Also, the up-down system of Fig. 5 permits a straight-through or colinear arrangement of the links in the relay system, and this feature constitutes an advantage over the zig-zag arrangement of Fig. 1.

Figure 6:
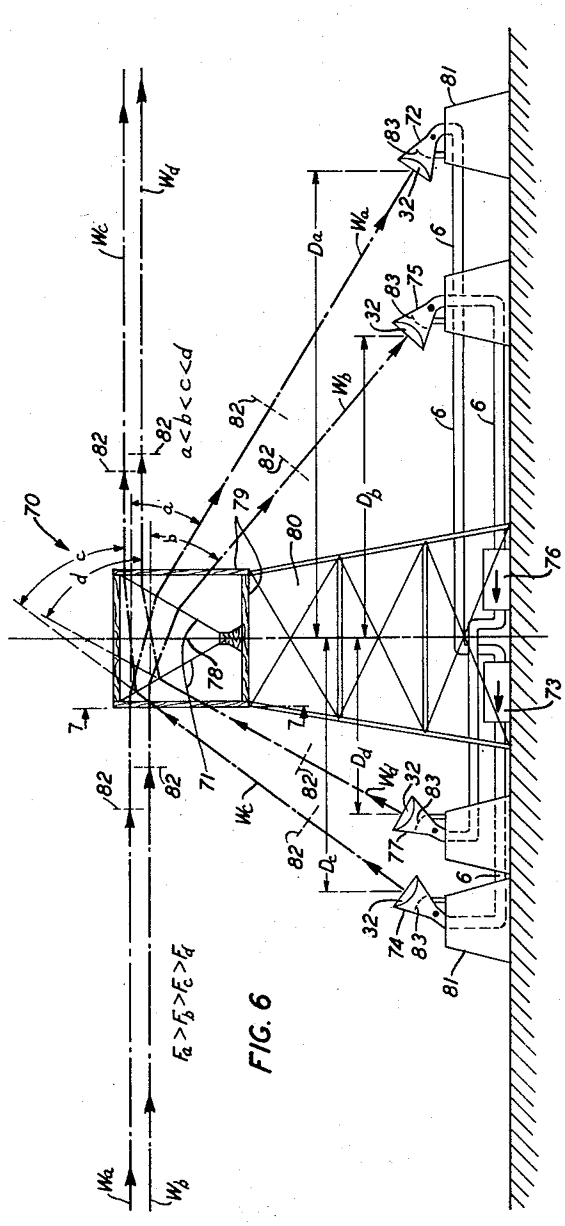
Figs. 6 and 7 are respectively side and partial front views of a multichannel one-way relay station constructed in accordance with the invention.
Figure 7:
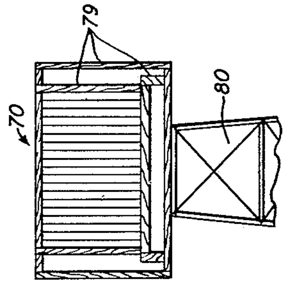

Referring to Figs. 6 and 7, the up-down dual-channel one-way relay system 70 comprises a metallic dielectric guide prism 71, a first receiving conical horn 72 connected through guides 6 and a first unilateral repeater 73 to a first transmitting conical horn 74, and a second receiving conical horn 75 connected through guides 6 and a second unilateral repeater 76 to a second transmitting conical horn 77. The dielectric guide prism is disclosed and claimed in my copending application Serial No. 642,722 filed January 22, 1946. Each horn contains a plano-convex metallic lens 32 of the delay type. As shown in Fig. 7, the two receiving horns 72 and 75 are on the right side of prism 71 and the two transmitting horns 74 and 77 are on the left side of prism 71. As explained in more detail below, in operation, the horns 72 and 75 receive waves having the respective carrier frequencies of $F_a$ and $F_b$ and the horns 74 and 77 transmit respectively waves having carrier frequencies of $F_c$ and $F_d$, where $F_a>F_b>F_c>F_d$. Since, as shown by Equation 3 of my above-mentioned copending application Serial No. 642,723, the refractive index $n$ of a dielectric guide refractor is related to the space wavelength $\lambda_o$, the four horns 72, 75, 74 and 77 are each spaced from the vertical center line 78 of prism 71 a distance which is a function of the frequency, or wavelength $\lambda_o$, of the wave received or transmitted by the horn. Thus, the respective distances $D_a$, $D_b$, $D_c$ and $D_d$, between the prism center line 78 and the horns 72, 75, 74 and 77 are related to the frequencies $F_a$, $F_b$, $F_c$ and $F_d$, respectively. Hence $D_a>D_b>D_c>D_d$. The prism 71 is mounted in a wooden frame 79 and supported on the high tower 80; and the horns are mounted on the low towers 81.

In operation, Fig. 6, two distinct waves $W_a$ and $W_b$ incoming along a horizontal propagation direction from the adjacent relay station at the left of relay station 70, and having plane wave fronts 82 and frequencies $F_a$ and $F_b$, respectively, where $F_a$ is greater than $F_b$, are intercepted by the metallic prism 71; and the propagation directions of waves $W_a$ and $W_b$ are refracted downwardly by the prism 71. By reason of the chromatic or dispersive action of prism 71, the directions of waves $W_a$ and $W_b$ are bent at angles $a$ and $b$ inversely related to the frequencies $F_a$ and $F_b$, that is, angle $a$ corresponding to the greater frequency $F_a$ is smaller than angle $b$ corresponding to the smaller frequency $F_a$; and the waves $W_a$ and $W_b$ are directed towards the receiving horns 72 and 75, each of which is spaced, as explained above, from the center line 78 of prism 71 a distance related to the frequency of the wave received by the horn. By virtue of the non-focussing action of prism 71, the plant fronts 82 of the two waves are not affected by the prism 71. At each of the conical receiving horns 72 and 75, the incoming plane front 82 is converted by lens 32 to a spherical wave front 83 converging on the horn throat orifice; and the waves $W_a$ and $W_b$ received by horns 72 and 75 are conveyed by individual guides 6 to the unilateral repeaters 73 and 76, respectively. In repeater 73, the wave $W_a$ is amplified and converted to a wave $W_c$ having a frequency $F_c$, where $F_c$ is smaller than $F_a$, and, in repeater 76, the wave $W_b$ is amplified and converted to a wave $W_d$ having a frequency $F_d$, where $F_d$ is smaller than $F_b$, the frequency $F_c$ being smaller than $F_b$ and greater than $F_d$. The waves $W_c$ and $W_d$ are conveyed, respectively, from repeaters 73 and 76 over separate guides 6 to the conical transmitting horns 74 and 77.

At each of the horns 74 and 77 the spherical outgoing wave front 83 originating at the throat orifice is converted by the mouth lens to a plane wave front 82, and the outgoing waves $W_c$ and $W_d$ are directed towards the prism 71. The prism in a sense bends or refracts these two wave directions different amounts, such that the waves $W_c$ and $W_d$ outgoing from the prism to the adjacent relay station at the right of relay station 70 have horizontal propagation directions. More particularly, the wave $W_c$ having the greater frequency $F_c$ is refracted an angle $c$ and the wave $W_d$ having the smaller frequency $F_d$ is refracted an angle $d$, the angle $d$ being greater than the angle $c$. In short, as in the case of the received waves $W_a$ and $W_b$, the refraction of waves $W_c$ and $W_d$ by prism 71 is inversely related to the frequencies $F_c$ and $F_d$ of the transmitted waves. Also, as in the case of the received waves, the prism does not affect the plane front 82 of the transmitted waves. Thus, in accordance with the invention, a simple relay station, as illustrated by Fig. 6 and comprising only one main passive member, is utilized in a one-way two-channel radio relay station. It may be added that, if desired, instead of a "fast" dielectric guide prism 71, a "slow" prism of the artificial dielectric type disclosed in my copending application Serial No. 748,447, filed May 16, 1947, may be utilized.

Although the invention has been explained in connection with certain embodiments, it is not to be limited to the embodiments described since other apparatus may be used in successfully practicing the invention.

What is claimed is:

1. A radio relay station comprising a repeater connected between a receiving antenna and a transmitting antenna and a radio lens positioned between said antennas and traversed in common by waves employed by said antennas.

2. A radio relay station in accordance with claim 1, said antennas being positioned on the same side of, and spaced from, the axis of said lens.

3. A radio relay station comprising a repeater connected between a receiving antenna and a transmitting antenna, and a concavo-concave lens having adjacent each of its faces a real focus, said antennas each being positioned at a different one of said foci and employing waves passing through said lens.

4. A radio relay station comprising a repeater connected between a receiving antenna and a transmitting antenna, a refractor positioned above and substantially between said antennas and having a pair of real foci, said refractor transmitting radio waves to said receiving antenna and from said transmitting antenna, each of said antennas being positioned at one of said foci.

5. A radio relay station in accordance with claim 4, said refractor having curvate faces and comprising a non-focussing section included between two focussing sections.

6. A radio relay station in accordance with claim 5, said refractor having concave faces and a uniformly tapered thickness, said refractor comprising a prismal portion included between two lenticular portions, the electromagnetic axes of the opposite faces of said last-mentioned portions being at an angle to each other.

7. A radio relay station comprising a pair of spaced antennas each for transmitting and receiving radio waves, each antenna comprising an auxiliary radio lens, a pair of repeaters connected in parallel and between said antennas, and a main radio lens positioned above and substantially between said antennas and passing radio waves going to and coming from each of said antennas, said main lens having a real focus at each of said antennas.

8. A radio relay station in accordance with claim 7, said repeaters each including a frequency changer, an amplifier and two pairs of filters, one pair being connected in parallel and between one antenna and said repeaters and the other pair being connected in parallel and between the other antenna and said repeaters, whereby the amplitude and frequency of the waves incoming to one antenna through the main lens are respectively increased and changed in one repeater and thence radiated by the other antenna, and the amplitude and frequency of the waves incoming to the last-mentioned antenna through the main lens are respectively increased and changed and thence radiated by the first-mentioned antenna.

9. A radio relay station comprising a metallic prism, a pair of antennas for radiating waves of different frequency to said prism, positioned below and on one side of said prism, a pair of antennas for receiving waves of different frequency from said prism, positioned below and on the other side of said prism, each antenna including a metallic lens, and a pair of repeaters, each repeater being connected between only one of said receiving antennas and only one of said transmitting antennas.

10. A radio relay system comprising a plurality of spaced relay stations, each relay station comprising a radio repeater connected between a transmitting antenna and a receiving antenna, a radio lens, said antennas being positioned on opposite sides of said lens and spaced from the lens axis, the transmitting antenna of a first relay station and the receiving antenna of a second relay station adjacent to and on one side of said first station being located on a straight line passing through the mid-points of the lenses at said first and second stations.

11. In a radio relay system in accordance with claim 10, the receiving antenna of the first-mentioned station and the transmitting antenna of a third relay station adjacent to and on the other side of said first station being located on a straight line passing through the mid-points of the lenses at the first and third stations.

12. A radio relay system comprising a first relay station, a second relay station and a third relay station, for relaying radio waves through the stations in the order: third to first to second station, the first station being located between, and displaced from, the straight line connecting the other two stations, each station comprising a repeater connected between a unidirective transmitting antenna and a unidirective receiving antenna and a radio lens common to the two antennas, the two antennas at each station being positioned on opposite sides of the common lens and on the same side of, and at a distance from, the lens axis, the lenses at the first and second stations being positioned between the transmitting antenna at the first station and the receiving antenna at the second station, and the lenses at the first and third stations being positioned between the receiving antenna at the first station and the transmitting antenna at the third station.

13. A relay system in accordance with claim 12, the axis of the major lobe of one antenna at the first station and the axis of the major lobe of the cooperating antenna at one of the other stations being aligned with a straight line passing through the mid-points of the lenses included between said antennas.

14. A radio relay system comprising a pair of point-to-point radio links each comprising a pair of cooperating transmitting and receiving unidirective antennas, a repeater connected between the receiver of one link and the transmitter of the other link and a radio lens traversed in common by waves employed by both of the said links and positioned between the cooperating antennas of each link.

15. A method of minimizing cross-talk at a one-way radio relay station which comprises receiving and transmitting at said station waves propagated along intersecting paths or links, at the point of intersection of said paths exerting a converging-action on the waves along each path, and receiving and transmitting said waves, after their intersection, at points in said station spaced several wavelengths apart.

16. A radio relay station comprising a pair of spaced lenses, a pair of transmitting antennas positioned on opposite sides of one lens, said lens transmitting radio waves emitted by both of said antennas, a pair of receiving antennas positioned on opposite sides of the other lens, said latter lens transmitting radio waves to both of said receiving antennas, a first means comprising an amplifier connecting one receiving antenna to one transmitting antenna, and a second means comprising an amplifier connecting the other receiving antenna to the other transmitting antenna.

17. A radio relay station for use with radio beams extending between said station and adjacent stations to either side of said station, the paths of said beams intersecting each other at said relay station, a converging lens positioned in the paths of said beams at their point of intersection, and two antennas respectively positioned in the paths of said beams at the foci of said lens.

WINSTON E. KOCK.

REFERENCES CITED

The following references are of record in the file of this patent:

UNITED STATES PATENTS

| Number | Name | Date |
|---|---|---|
| 1,624,966 | Morris | Apr. 19, 1927 |
| 1,668,637 | Espenschied et al. | May 8, 1928 |
| 1,877,815 | Conrad | Sept. 20, 1932 |
| 1,927,394 | Darbord et al. | Sept. 19, 1933 |
| 1,939,345 | Gerth et al. | Dec. 12, 1933 |
| 2,042,302 | Frantz et al. | May 26, 1936 |
| 2,064,961 | Tidd | Dec. 22, 1936 |
| 2,103,357 | Gerhard | Dec. 28, 1937 |
| 2,146,301 | Knotts et al. | Feb. 7, 1939 |
| 2,311,467 | Peterson | Feb. 16, 1943 |
| 2,415,352 | Iams | Feb. 4, 1947 |